US011797957B2

(12) United States Patent
Jackman et al.

(10) Patent No.: US 11,797,957 B2
(45) Date of Patent: Oct. 24, 2023

(54) SOFTWARE SYSTEM THAT ENABLES INSTANT DISBURSMENT OF FUNDS BETWEEN PAYERS AND PAYEES

(71) Applicant: FINTAINIUM, INC., Jacksonville, FL (US)

(72) Inventors: Richard Jackman, Jacksonville, FL (US); Romi Kohli, Markham (CA); Simarpreet Singh, Ajax (CA)

(73) Assignee: FINTAINIUM, INC., Jacksonville, FL (US)

( * ) Notice: Subject to any disclaimer, the term of this patent is extended or adjusted under 35 U.S.C. 154(b) by 395 days.

(21) Appl. No.: 16/425,860

(22) Filed: May 29, 2019

(65) Prior Publication Data

US 2019/0370808 A1    Dec. 5, 2019

Related U.S. Application Data (60) Provisional application No. 62/679,538, filed on Jun. 1, 2018.

(51) Int. Cl.
  *G06Q 20/10* (2012.01)
  *G06Q 20/40* (2012.01)
  *G06Q 20/14* (2012.01)

(52) U.S. Cl.
  CPC .......... *G06Q 20/10* (2013.01); *G06Q 20/102* (2013.01); *G06Q 20/14* (2013.01); *G06Q 20/401* (2013.01); *G06Q 2220/00* (2013.01)

(58) Field of Classification Search
  CPC ....... G06Q 20/102; G06Q 20/10–1085; G06Q 20/14; G06Q 20/326; G06Q 20/3821;

(Continued)

(56) References Cited

U.S. PATENT DOCUMENTS 6,029,150 A * 2/2000 Kravitz ................. G06Q 20/12
  705/77
8,606,602 B2 * 12/2013 Prange .................. G06Q 30/04
  705/4

(Continued)

FOREIGN PATENT DOCUMENTS

EP        3675013 A1 *  7/2020  ......... G06Q 20/3829
WO  WO-2019068129 A1 *  4/2019  ........... G06Q 20/102

OTHER PUBLICATIONS

M. Carbonell, J. M. Sierra, J. Torres and A. Izquierdo, "Security analysis of a new multi-party payment protocol with intermediary service.," 18th International Workshop on Database and Expert Systems Applications (DEXA 2007), 2007, pp. 698-702, doi: 10.1109/DEXA.2007.130. (Year: 2007).*

(Continued)

*Primary Examiner* — Jay Huang
(74) *Attorney, Agent, or Firm* — ASLAN LAW, P.C.

(57) ABSTRACT

A system where a payer transmits a first-time enrollment request to a portal, where the first-time enrollment request includes initial identifying information of said first circuit and/or communication circuit. In the system, the portal generates an out-of-band blockchain notification requesting authentication from a recipient. In addition, the recipient receives the out-of-band notification whereby the recipient accepts the funds and initial enrollment is completed through the portal. Furthermore, the portal communicates with a third party for verification and transmits an enrollment confirmation to the recipient. Also, the portal transmits an enrollment confirmation upon the successful/unsuccessful enrollment of the recipient.

5 Claims, 7 Drawing Sheets

(58) Field of Classification Search
CPC ............... G06Q 20/389; G06Q 20/401; G06Q 2220/00; G06Q 20/407; H04L 63/18
See application file for complete search history.

(56) References Cited

U.S. PATENT DOCUMENTS

| | | | |
|---|---|---|---|
| 2005/0021464 A1* | 1/2005 | Lindauer | G06Q 40/03 705/40 |
| 2007/0043663 A1* | 2/2007 | Simpson | G06Q 20/12 705/39 |
| 2012/0239560 A1* | 9/2012 | Pourfallah | G06Q 20/102 705/40 |
| 2015/0379486 A1* | 12/2015 | Verde | G06Q 20/102 705/40 |
| 2017/0032337 A1* | 2/2017 | Berger | G06Q 20/102 |
| 2017/0109746 A1* | 4/2017 | Mohandas | G06Q 20/401 |
| 2019/0114602 A1* | 4/2019 | Incedayi | G06Q 20/02 |

OTHER PUBLICATIONS

Sumanjeet, "Emergence of payment systems in the age of electronic commerce: The state of art," 2009 First Asian Himalayas International Conference on Internet, Kathmundu, Nepal, 2009, pp. 1-18, doi: 10.1109/AHICI.2009.5340318 (Year: 2009).*
WIPO Certified Priority Document AU 2017904847 (Year: 2018).*
WIPO Certified Priority Document AU 2017904049 (Year: 2018).*

* cited by examiner

FIG 2. Payer Funds Disbursement to a Recipient (Transactions Diagram)

FIG 4. Recipients' Organic Transformation into Payers

FIG. 5 method and system of exchange of payment information and supporting documentations from payer to recipient FIG. 6 method and system of exchange of payment information and supporting documentations from recipient to payer

FIGURE 7

SOFTWARE SYSTEM THAT ENABLES INSTANT DISBURSMENT OF FUNDS BETWEEN PAYERS AND PAYEES

RELATED APPLICATION DATA

This application claims the benefit of priority to Provisional Application No. 62/679,538, filed on Jun. 1, 2018. The entire contents of each of the above-identified applications are hereby incorporated by reference in their entirety.

FIELD OF THE INVENTION

The present disclosure generally relates to disbursement of funds between a Payer and a Payee (or Recipient). More specifically, the present disclosure generally relates to methods, systems, and computer program products relating to a disbursement of funds between a Payer and a Payee (or Recipient). The Payer is typically but not always a corporation, an employer or other organization such as a non-profit or governmental entity that is processing payments to individuals or other businesses. The system is applicable to the field of payments processing, payroll processing and other systems that enable monetary value to be exchanged between people or businesses.

BACKGROUND

Conventional payments or disbursement software requires the Payer to integrate multiple payments methods in order to satisfy its business requirements and address a broad range of Payees such as employees, contractors, vendors, and other similar entities. Payers have diverse requirements for various reasons not limited to complying with regulation to convenience and speed.

Recipients similarly are often limited to receiving their payment through methods such as bank transfer via Automated Clearing House (ACH) which may not suffice from a regulatory perspective or may delay the Recipients' access to their payment for up to 3 days.

The need to integrate with multiple systems or vendors creates difficulties in settlement and reconciliation of payment transactions, record keeping, escheatment of abandoned property and other similar operational challenges. These limitations place significant burdens on Payers.

Furthermore, the current environment impacts the ability of the Payer to provide sufficient optionality to its Recipients and address their needs in terms of availability, acceptance, cost, speed.

Finally, Payers and Recipients are required to exchange transaction information such as invoice, receipt, paystub or other supporting documentations for proper record keeping and accounting. This exchange of information can become problematic in case of remote recipients or recipients with limited access to mobile networks. This difficulty can result in delay in payments or out of compliance situations for the payer.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The methods, systems, and computer program products of the present invention center around a platform that connects Payers and Recipients seamlessly, provides Payers with a one stop for all its payment needs and enable Recipients the flexibly to elect the payment methods best suit their situation.

This novel system enables Payers to disburse funds to different type of Recipients such as employees, contractors, vendors or customers through the one system. This comprehensive system requires only one settlement account and greatly reduce the complexity of managing multiple settlement accounts widely available solutions requires. In summary, the system allow Payer to converge what is typically a disperse funds disbursement process in to a single distinct process.

In contrast, the system provides a wide range of options for Recipients to receive their funds. Recipients, after completing a streamlined registration process are prompt to select which method they would like to redeem their funds. The options available to customers include but not limited to bank transfer, store gift card, bill payment, international transfer, payroll card, cash pickup at a store or ATM or other proprietary methods. In addition, Recipients can bifurcate a payment in to multiple redemptions methods.

The system, in addition to enabling funds flow between Payer and Recipients, enable the exchange of information and supporting documentations required for transparency and proper record keeping between the parties.

Lastly, one unique aspect among many aspects of this system is enabling Recipients to become Payers and utilize our system to disburse funds to new recipients directly from funds paid to them previously.

Aspects of the present invention provide an apparatus comprising: a first circuit and/or communication circuit 120; a second circuit and/or communication circuit (130); a third circuit and/or communication circuit (140); and a fourth circuit and/or communication circuit (150), wherein the first circuit and/or communication circuit 120 is configured and/or programmed to transmit a first-time enrollment request (101) to the second circuit and/or communication circuit (130), the first-time enrollment request (101) includes initial identifying information of said first circuit and/or communication circuit, the second circuit and/or communication circuit (130) is configured and/or programmed to generate an out-of-band blockchain notification (102) requesting authentication from the third circuit and/or communication circuit (140), the third circuit and/or communication circuit (140) is configured and/or programmed to receive the out-of-band notification (102) whereby the third circuit and/or communication circuit (140) accepts the funds and initial enrollment is completed through the second circuit and/or communication circuit 130, the second circuit and/or communication circuit (130) is configured and/or programmed to communicate (104) with the fourth circuit and/or communication circuit 150 for verification and transmits an enrollment confirmation 105 to the third circuit and/or communication circuit, the second circuit and/or communication circuit (130) is configured and/or programmed to transmit an enrollment confirmation (106) upon the successful/unsuccessful enrollment of the third circuit and/or communication circuit (140).

Further, aspects of the present invention provide a method comprising: transmitting a first-time enrollment request (101), wherein the first-time enrollment request (101) includes initial identifying information; generating an outof-band blockchain notification (102) requesting authentication; receiving the out-of-band notification (102); communicating (104) for verification and transmitting an enrollment confirmation 105; and transmitting an enrollment confirmation (106) upon the successful/unsuccessful enrollment. In addition, aspects of the present invention provide a non-transitory computer readable medium having instructions stored thereon, such that when the instructions are read and executed by one or more processors, said one or more processors is configured to perform the above mentioned method.

Also, aspects of the present invention provide an apparatus comprising: a first circuit and/or communication circuit 220; a second circuit and/or communication circuit (230); a third circuit and/or communication circuit (240), wherein the first circuit and/or communication circuit 220 is configured and/or programmed to transmit an initiation message (201) to the second circuit and/or communication circuit (230), the second circuit and/or communication circuit (230) is configured and/or programmed to generate an out-of-band blockchain notification (202) requesting authentication in response to receiving said initiation message (201), the third circuit and/or communication circuit (240) is configured and/or programmed to receives and accepts the notification (202), and send a Payment acceptance notification (203) to the second circuit and/or communication circuit (230), the second circuit and/or communication circuit (230) is configured and/or programmed to transmit an notification of payment acceptance message (204) to the first circuit and/or communication circuit 220 in a case of a successful enrollment result, the second circuit and/or communication circuit (230) is configured and/or programmed to transmit a communication (206) to the third circuit and/or communication circuit (240) providing redemption options, the second circuit and/or communication circuit (230) is configured and/or programmed to debits an account (205) associated with the first circuit and/or communication circuit 220, the third circuit and/or communication circuit (240) is configured and/or programmed to select either redeeming an entire payment at once or to leave a balance in an account in response to receiving the communication (206), the third circuit and/or communication circuit (240) is configured and/or programmed to transmit the selected method of redemption 207, the second circuit and/or communication circuit (230) is configured and/or programmed to transmit the debit amount to the third circuit and/or communication circuit 240 and fulfil the redemption request 209 in response to receiving communication 207.

Further, aspects of the present invention provide a method comprising: transmitting an initiation message (201); generating an out-of-band blockchain notification (202) requesting authentication in response to receiving said initiation message (201), receiving and accepting the notification (202), and sending a Payment acceptance notification (203); transmitting an notification of payment acceptance message (204) in a case of a successful enrollment result; transmitting a communication (206) providing redemption options; debiting an account (205); selecting either redeeming an entire payment at once or to leave a balance in an account in response to receiving the communication (206); transmitting the selected method of redemption 207; and transmitting the debit amount and fulfilling the redemption request 209 in response to receiving communication 207. In addition, aspects of the present invention provide a non-transitory computer readable medium having instructions stored thereon, such that when the instructions are read and executed by one or more processors, said one or more processors is configured to perform the above mentioned method.

In addition, aspects of the present invention provide an apparatus comprising: a first circuit and/or communication circuit 520; a second circuit and/or communication circuit (530); and a third circuit and/or communication circuit (540), wherein the first circuit and/or communication circuit 520 is configured and/or programmed to attach a pay-advice to a payment allocation request 501 and transmits the payment allocation request 501 to the second circuit and/or communication circuit (530), the third circuit and/or communication circuit 540 is configured and/or programmed to receive a notification 502 a pay-advice is available for review, the third circuit and/or communication circuit 540 is configured and/or programmed to review and accept the pay-advice via a communication 503, the first circuit and/or communication circuit 520 is configured and/or programmed to notify that the pay-advice was reviewed and accepted by third circuit and/or communication circuit via a communication 504, payment allocation is available to the third circuit and/or communication circuit 540 via a communication 505, and pay-advice information is available to the third circuit and/or communication circuit 540 at any time for review or download via a communication 506.

Also, aspects of the present invention provide a method comprising: attaching a pay-advice to a payment allocation request 501 and transmitting the payment allocation request 501; receiving a notification 502 a pay-advice is available for review; reviewing and accepting the pay-advice via a communication 503; and notifying that the pay-advice was reviewed and accepted via a communication 504, wherein payment allocation is available via a communication 505, and pay-advice information is available to at any time for review or download via a communication 506. In addition, aspects of the present invention provide a non-transitory computer readable medium having instructions stored thereon, such that when the instructions are read and executed by one or more processors, said one or more processors is configured to perform the above mentioned method.

Further, aspects of the present invention provide an apparatus comprising: a first circuit and/or communication circuit 620; a second circuit and/or communication circuit (630); and a third circuit and/or communication circuit (640), wherein the third circuit and/or communication circuit 640 is configured and/or programmed to upload an invoice to first circuit and/or communication circuit 620 with payment details, the invoice is communicated to the second circuit and/or communication circuit 630 via a communications 601, the second circuit and/or communication circuit (630) is configured and/or programmed to notify the first circuit and/or communication circuit 620 that an invoice is available for review via a communication message 602 in response to receiving the invoice upload 601, the first circuit and/or communication circuit 620 is configured and/or programmed to review the invoice and generate a payment allocation 603 to pay the invoice immediately or at the due date in response to receiving the communications 602, the third circuit and/or communication circuit 640 is configured and/or programmed to notify via a communication 604 that the payment allocation is available for the third circuit and/or communication circuit 640, the first circuit and/or communication circuit 620 is notified the payment has been accesses via a communication 605, and the third circuit and/or communication circuit 640 is configured and/or programmed to access the invoices for review or download (606).

Also, aspects of the present invention provide a method comprising: uploading an invoice with payment details, wherein the invoice is communicated 630 via a communications 601; transmitting a notification that an invoice is available for review via a communication message 602 in response to receiving the invoice upload 601; reviewing the invoice and generating a payment allocation 603 to pay the invoice immediately or at the due date in response to receiving the communications 602, transmitting, via a communication 604, a notification that the payment allocation is available; receiving a notification that the payment has been accepted via a communication 605; and accessing the invoices for review or download (606). In addition, aspects of the present invention provide a non-transitory computer readable medium having instructions stored thereon, such that when the instructions are read and executed by one or more processors, said one or more processors is configured to perform the above mentioned method.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification.

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. In the drawings.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Descriptions of well-known starting materials, processing techniques, components and equipment may be omitted so as not to unnecessarily obscure the invention in detail. It should be understood, however, that the detailed description and the specific examples, while indicating (e.g., preferred) embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Before discussing specific embodiments, embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.) or the like. In various embodiments, the computer has access to at least one database over the network.

ROM, RAM, and HD are computer memories for storing data and computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

Figure 1:
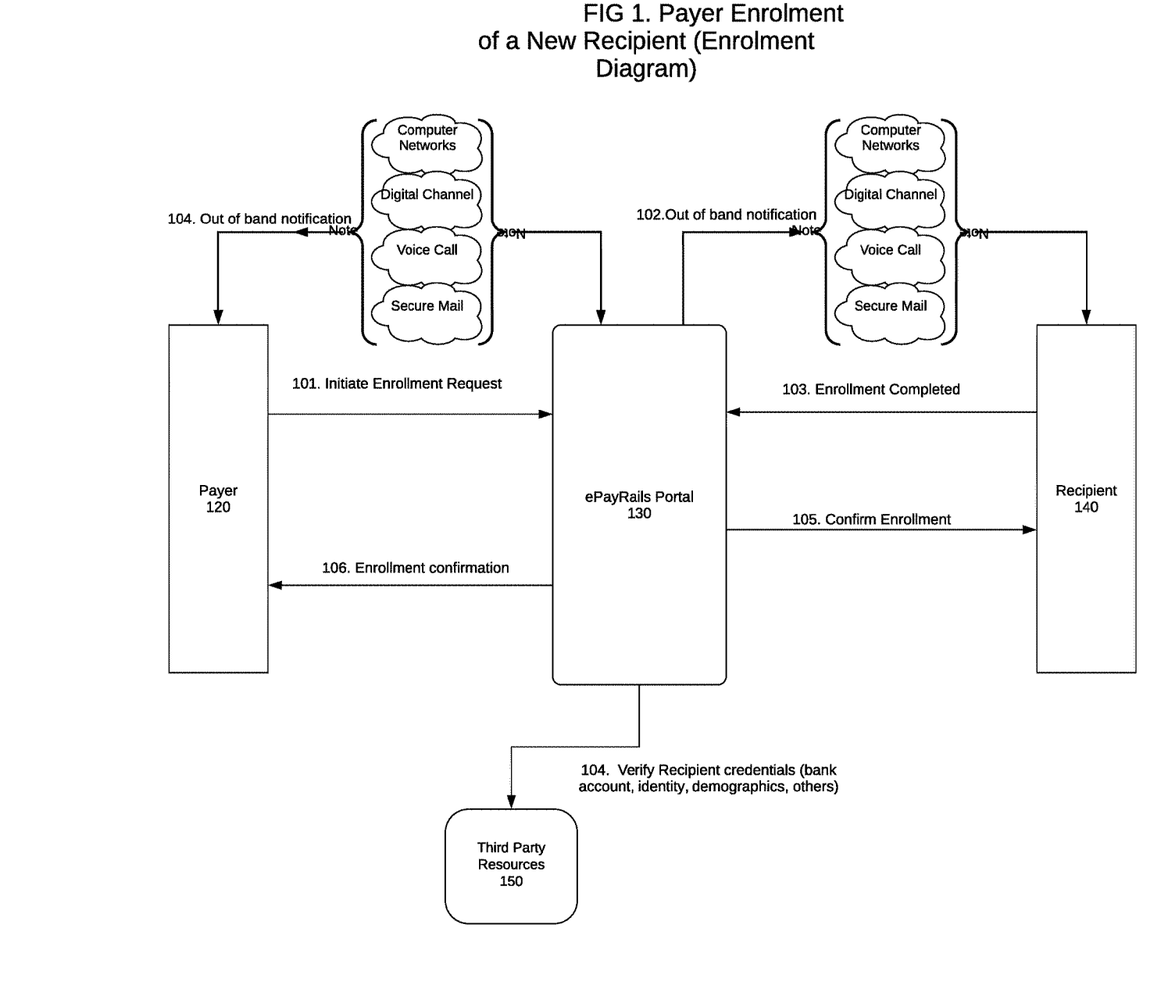
FIG. 1 is an illustration of Payer enrollment of a new Recipient according to an embodiment of the present invention.

FIG. 1 shows Payer enrollment of a new Recipient. In an embodiment of the present invention, the EPR Platform functions as the central hub through which the payer (120) and the recipient (140) communicate.

The Payer 120 will initiate a first-time enrollment request (101) to the recipient (140) through the EPR platform. This request will include the recipient's initial identifying information such as name, email address, date of birth, social security number, or the like. Based on the ePayRails Portal (130) receiving the identifying information from the Payer (120), the ePayRails Portal (130) will generate an out-of-band blockchain notification (102) requesting authentication from the recipient (140) through a variety of delivery channels including SMS messaging, emails, phone call verifications, as some examples.

The recipient (140) receives the out-of-band notification (102) whereby the recipient (140) accepts the funds and initial enrollment is completed through the EPR systems. Here, by the recipient (140) enrolling in the EPR system and reviewing (and/or receiving) their funding, the recipient (140) has accepted the invitation to enroll and the recipient (140) send an enrollment confirmation (105). Completed enrollment (105) may include the creation of a unique user ID, password, and additional personal information as required to utilize the services built into the EPR platform. The recipient's enrollment is confirmed through the EPR platform via a completed enrollment communications (105).

The recipient's personal information must be validated depending on the nature of the services the recipient will be trying to access through the EPR system. The EPR system may interface with publicly available information regarding the recipient in addition to other service providers in the financial services industry such as a credit bureau. The ePayRails Portal will communicate (104) with Third Party (or Parties) 150 for verification. Similarly, the Recipient (140) may also communicate with Third Party (or Parties) 150 for verification where the ePayRails Portal may receive confirmation of the verification from the Third Party (or Parties) 150.

The payer (120) will receive an enrollment confirmation (106) upon the successful/unsuccessful enrollment of the recipient through the EPR platform via SMS/mobile app notification/email. In the unlikely case of unsuccessful enrollment the system will inform the Payer that payment wasn't successful so the Payer can correct the issue or make other payment arrangement.

Figure 2:
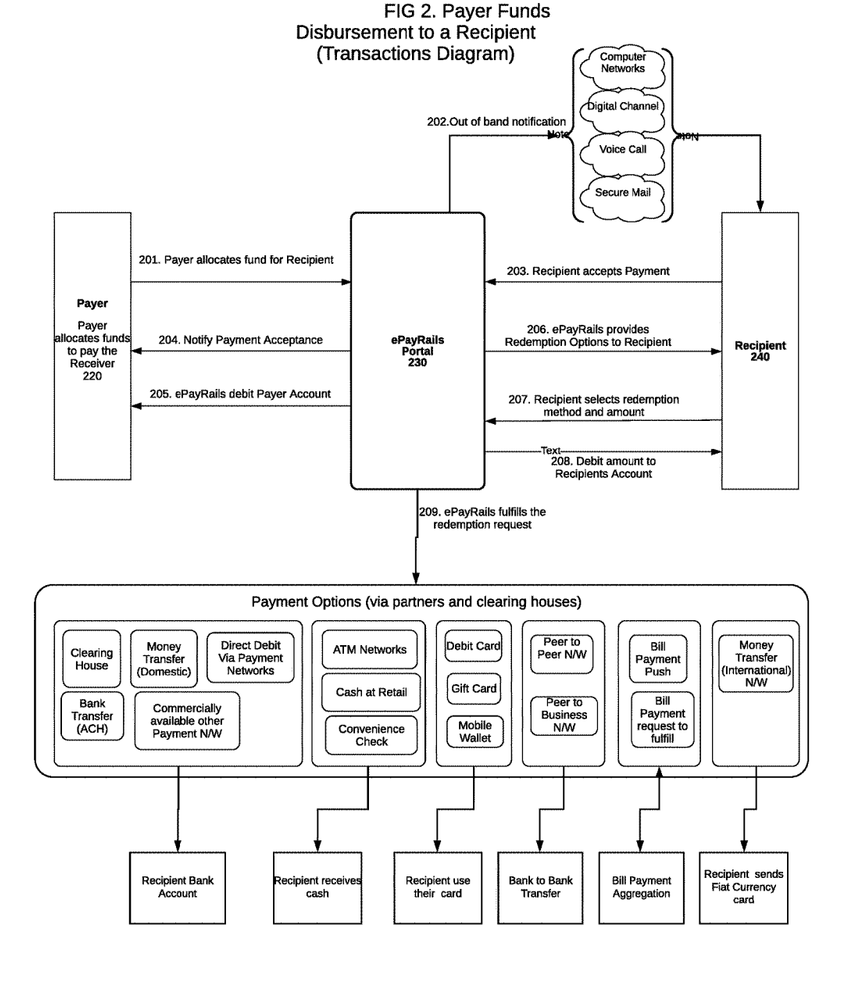
FIG. 2 is an illustration of Payer funds disbursement to a Recipient according to an embodiment of the present invention.

FIG. 2 shows an embodiment of the present invention where Payer funds disbursement to a Recipient. A Payer may be Party that is sending funds to the payee or recipient. A Recipient may be Party that is receiving the funds that are sent from the payer.

A Payer (220) accesses the EPR system to initiate an allocation of funds for the recipient (240). This transaction can include peer-to-peer transactions. This initiation for an allocation of fund is preformed by the Payer (220) sending an initiation message (201) to the EPayRails Portal/Platform (230).

Based on the ePayRails Portal (230) receiving the initiation message (201) from the Payer (220), the ePayRails Portal (230) will generate an out-of-band blockchain notification (202) requesting authentication from the recipient (240) through a variety of delivery channels including SMS messaging, emails, phone call verifications, as some examples. The generation of the blockchain authentication notification (202) may be performed prior to the recipient (240) being notified, e.g., before notification (202) is routed to the recipient. Notification (202) may be delivered through several different channels including but not limited to a voice message, SMS message, and email.

The payee/recipient (240) receives and accepts the notification (202) generated by the portal 240 which was initiated by payer (220). This process is routed back through the EPR platform by the recipient (240) sending a Payment acceptance notification (203). For first time users to the platform, they will receive a code (QR, etc) prompting them to enroll in the platform. The code for a first time user is a unique for each payment and in combination with the user email address or phone number create a unique record in our system which allow the Recipient to register and claim their payments.

Payer (220) receives notification of acceptance of payment through the EPR application via an notification of payment acceptance message (204) and will have their account debited. In case of unsuccessful enrollment, the Payer is also notified so they can resolve the issue or make other payment arrangement.

ePayRails (230) sends a communication (206) to the recipient providing redemption options. The recipient (240) receives different options (direct deposit, gift cards to certain retailers, vanilla visa, cashier's check, and/or etc.) through which the recipient (240) can redeem their payment.

A payment acceptance notification (204) is generated as a result of successful enrollment and acceptance of payment by the Recipient (203). In conjunction with the Payment Acceptance notification (204) EPR system debit the Payer account (205). The Payer account is defined as an account establish by ePayRails for the benefit of the Payer or a bank account at another financial institution established by the Payer and connected to the ePayRails system for the purpose of paying recipients.

Upon receiving the communication (206), the Recipient (240) has the choice of whether to redeem the entire payment at once or to leave a balance in the EPR account. They can for example redeem 50% of the payment on a vanilla visa and leave the remainder in their account. The choice or choices, the recipients selection are transmitted to the ePayRails Portal/system 230 via a communications (207).

ePayRails fulfills the redemption request by making the funds available to the recipient in the format they have previously chosen. More specifically, in response to ePayRails 230 receiving the communications 207, ePayRails 230 fulfills the redemption request by sending a communication (209) to the applicable payment network or other 3rd party which is utilized by ePayRails 230 to provide the applicable payment option.

209: The payment request gets routed and completed through ePayRails' Payment Partners and clearing houses. The EPR system debit the customer available balance (208) and utilizing the payment network its connected to or the partnership its established fulfilled the recipients redemption method (207). This sentence needs to be expanded to clearly describe 208 and 209, please elaborate.

It should be noted that communication/step 101 may be similar to communication/step 201, and vice versa. Furthermore, it should be noted that communication/step 102 may be similar to communication/step 202, and vice versa. It should be noted that ePayRails portal of this embodiment may be the same or similar to the ePayRails portal of other embodiments.

Figure 3:
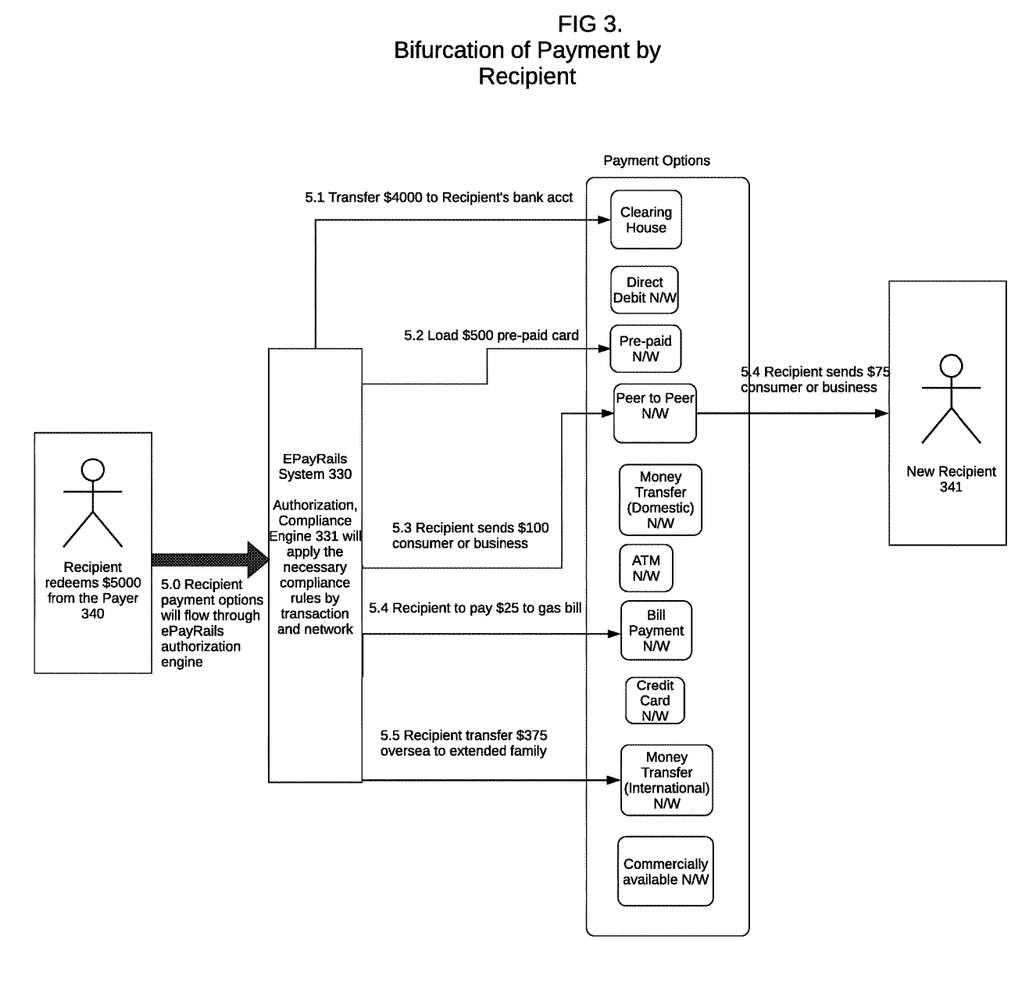
FIG. 3 is an illustration of bifurcation of payment by Recipient according to an embodiment of the present invention.

FIG. 3 shows an embodiment of the present invention where Bifurcation of payment by Recipient 340.

The Recipient's redemption options will be offered to them through the ePayRails system 330. The recipient will have access to a web portal or a mobile app where they can redeem their funds and select payment options. As part of the process ePayRails System 330 will use its Authorization and Compliance Engine 331 to determine which applicable customer verification, velocity and spending rules should apply based on the payment options selected by the customer. Based on the decisions made by The ePayRails Authorization System 331, the ePayRails system 330 may request additional information from the user to complete its decisioning process. In addition the ePayRails Authorization Engine may reject one or all payment options selected by the user based on the programs and parameters imbedded in the Authorization Engine 331.

The Recipient transfers $4000 of their ePayRails Account Balance to their bank account (5.1). This process will flow through a Clearing House 351.

The Recipient 340 takes the option of loading $500 from their ePayRails Account Balance to a pre-paid credit card (5.2).

The Recipient 340 sends $100 of their ePayRails Account Balance to a consumer or a business through the ePayRails Peer to Peer Network (5.3). By Recipient 340 sending the $100, the original Recipient creates a new Recipient 341 as a result of the ePayRails' Organic Growth Engine. It should be noted that recipient 340 may be payer 120 and/or payer 220; and new recipient 341 may be recipient 140 and/or payer 240.

The Recipient 340 directs $25 of their ePayRails Account Balance to pay for their utilities bill through the ePayRails Bill Payment Network.

The Recipient 340 transfers $375 of their ePayRails Account Balance via International Money Transfer (5.5).

Figure 4:
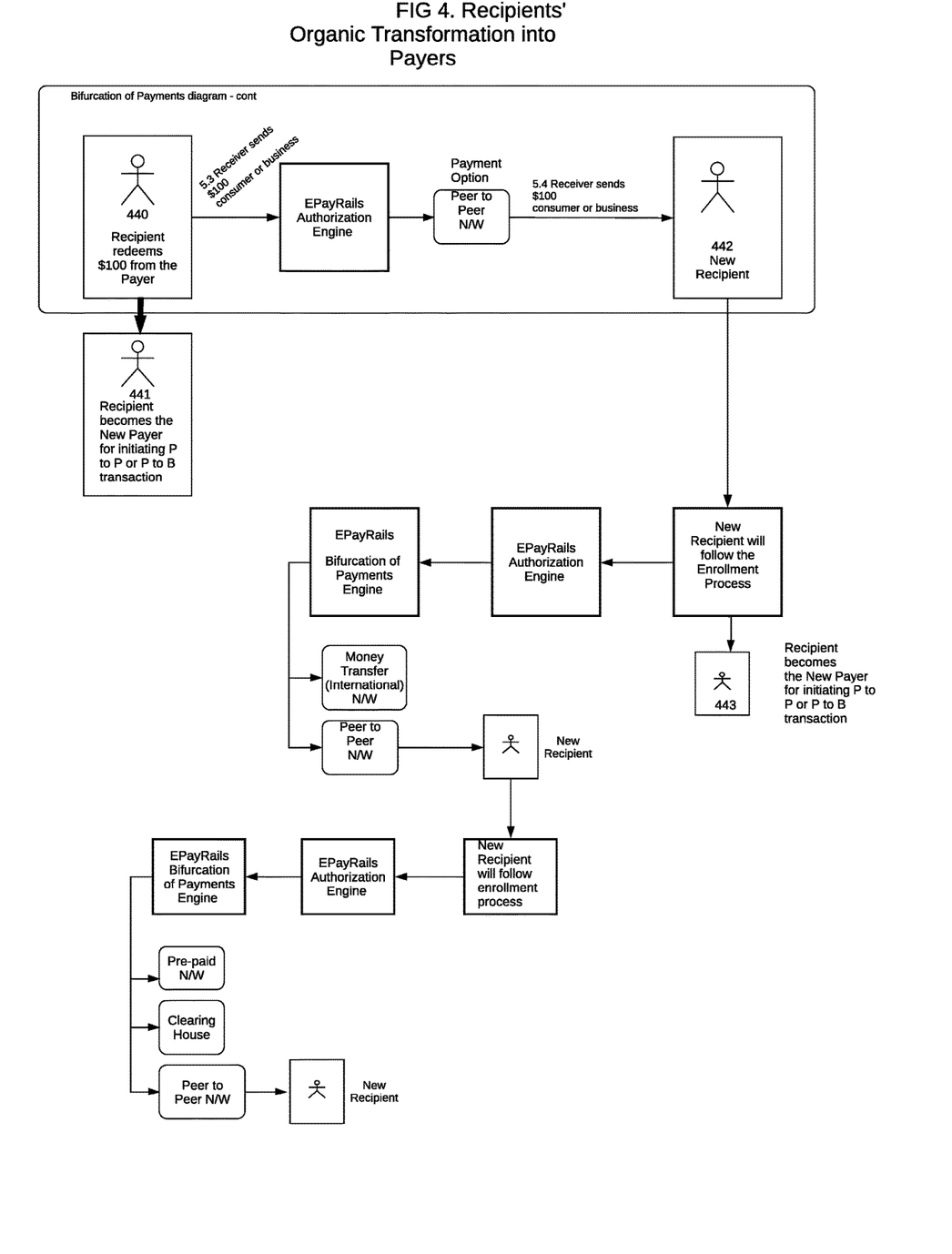
FIG. 4 is an illustration Recipients transformation to Payers according to an embodiment of the present invention.

FIG. 4 shows an embodiment of the present invention where Recipients transformation to Payers. FIG. 4 illustrates an example of how through continued use of Peer-to-Peer payments and redemptions of payments received, the EPR platform is able to grow itself through an increasing volume of completed transaction.

Using the EPR platform, Payer 1 (440) will send payments to two different Receivers: Receiver 1 (441) and Receiver 2 (442). Receiver 1 (441) redeems their payment through ACH and their journey with EPR ends here. Receiver 2 (442) however redeems their payment and then uses the EPR platform to send payment to a new Receiver (Receiver 3, 443). Receiver 2 now also becomes a Payer (Payer 2). From here, Receiver 3 (443) is able to continue the cycle first put into motion by Receiver/Payer 2. It should be noted that Payer 1 (440) may be payer 120, payer 220, and/or payer 340; and new recipients 441 and/or 442 may be recipient 140, payer 240, and/or payer 341. It should be noted that ePayRails portal of this embodiment may be the same or similar to the ePayRails portal of other embodiments.

Figure 5:
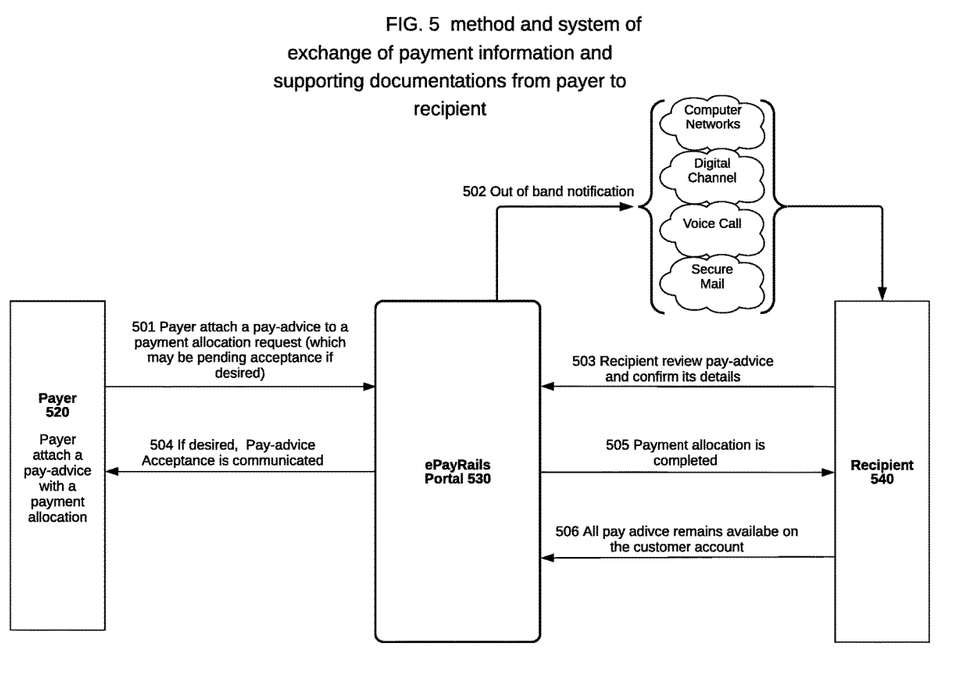
FIG. 5 is an illustration of exchange of payment information and supporting documentations from payer to recipient according to an embodiment of the present invention.

FIG. 5 shows an embodiment of the present invention where Exchange of payment information and supporting documentations from Payer to Recipient.

Payer 520 attaches a pay-advice to a payment allocation request 501. The allocation request 501 may be issued in a pending state which will require the recipient 540 to review the accuracy of their payment and accept it. The process of Exchange of payment information may be completed at the same time as the Payer funds disbursement to a Recipient Payment (FIG. 2) where A Payer (220) accesses the EPR system to initiate an allocation of funds for the recipient (240) or at any point after the Allocation of funds by the Payer 220.

The recipient 540 receive a notification 502 a pay-advice is available for review.

The recipient 540 review and accept the pay-advice via a communication 503.

The payer 520 is notified that the pay-advice was reviewed and accepted by recipient via a communication 504.

Payment allocation is available to recipient via a communication 505.

Pay-advice information is available to recipient at any time for review or download via a communication 506.

It should be noted that Payer 520 may be payer 120, payer 220, payer 340 and/or payer 520; and recipient 540 may be recipient 140, payer 240, payer 341 and/or new recipients 441 or 442. It should be noted that ePayRails portal of this embodiment may be the same or similar to the ePayRails portal of other embodiments.

Figure 6:
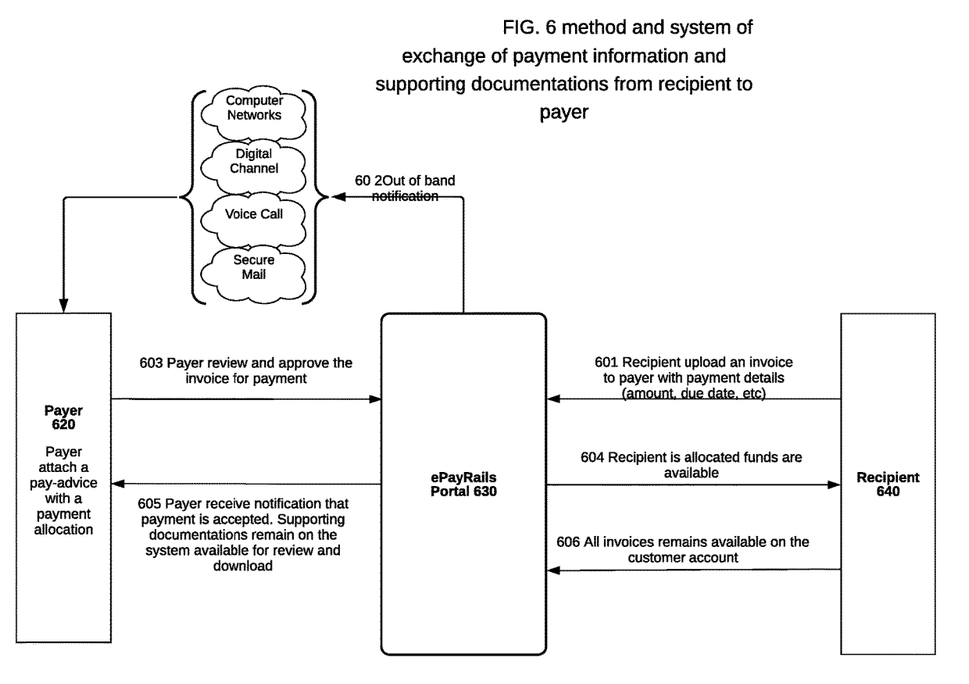
FIG. 6 is an illustration exchange of payment information and supporting documentations from recipient to payer according to an embodiment of the present invention.

FIG. 6 shows an embodiment of the present invention where Exchange of payment information and supporting documentations from Payer to Recipient.

The Recipient 640 uploads an invoice to payer 620 with payment details (amount, due date, invoice number, others). The invoice is communicated to the ePayRails Portal via a communications 601.

In response to ePayRails Portal 630 receiving the invoice upload 601, ePayRails may notify the Payer 620 that an invoice is available for review via a communication message 602. The system also allows for the recipient to set automated scheduling of multiple communications 602 to be sent if the Payer does not act on payment of the invoice. For example, if a first communication 602 is sent to the payer 620 that an invoice is upload and the payer does not pay the invoice within a month of transmission of the first communication 602, the recipient 640 can also set monthly reminders to be automatically sent to the payer 620 until the invoice is paid.

After receiving the communications 602, the payer 620 may review the invoice and can generate a payment allocation 603 to pay the invoice immediately or at the due date (or any other date).

The recipient 640 is notified via a communication 604 that the payment allocation is available for the recipient 640.

The payer 620 is notified the payment has been accesses via a communication 605. The ePayRails system/portal allows for all invoices and payment information to be available to the payer 620 for review or download—in addition to the recipient 640, whereby the Recipient can access the invoices at any time for review or download (606).

It should be noted that Payer 620 may be payer 120, payer 220, payer 340, payer 520, and/or payer 520; and recipient 640 may be recipient 140, payer 240, payer 341, new recipients 441 or 442, and/or recipient 540. It should be noted that ePayRails portal of this embodiment may be the same or similar to the ePayRails portal of other embodiments.

Figure 7:
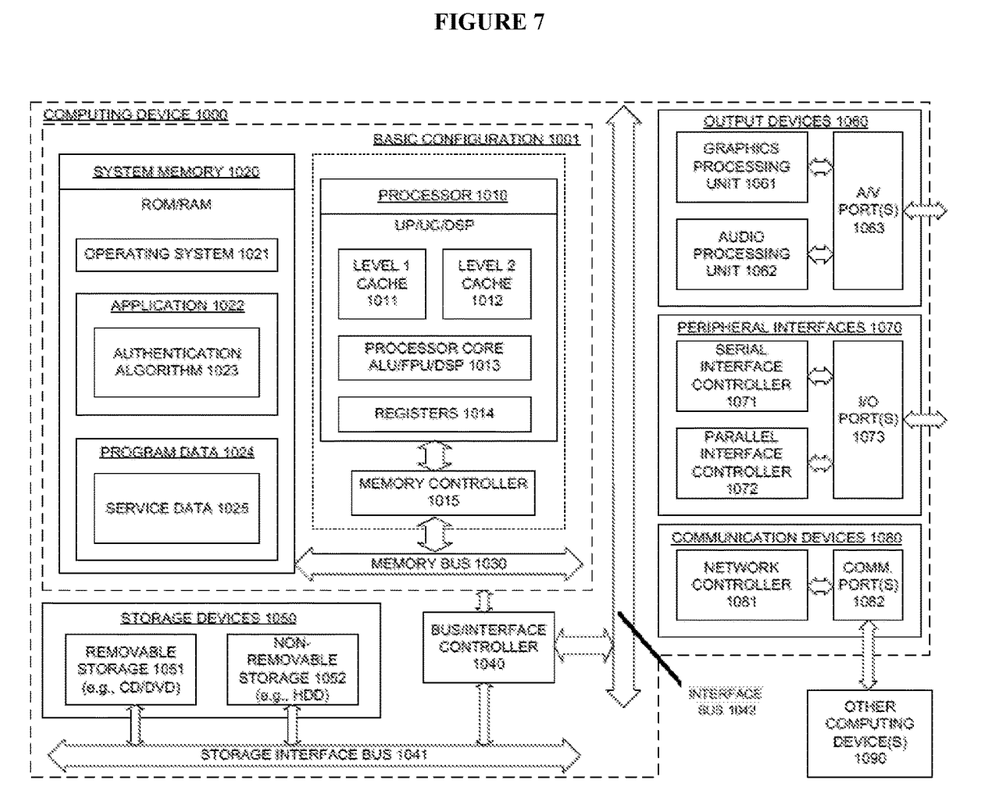
FIG. 7 is a circuit diagram of one aspect of a computing device/controller 1000 that works in conjunction with the elements of the present disclosure The headings provided herein are for convenience only and do not necessarily affect the scope or meaning of the claimed invention.

FIG. 7 is a circuit diagram of one aspect of a computing device/controller 1000 that works in conjunction with the elements of the present disclosure. In a very basic configuration of computing device 1000, the computing device 1000 typically includes one or more processors 1010 and a system memory 1020. A memory bus 1030 can be used for communications between the processor 1010 and the system memory 1020.

Depending on the desired configuration, the one or more processor 1010 of computing device 1000 can be of any type including but not limited to a microprocessor, a microcontroller, a digital signal processor, or any combination thereof. Processor 1010 can include one more levels of caching, such as a level one cache 1011 and a level two cache 1012, a processor core 1013, and registers 1014. The processor core 1013 can include an arithmetic logic unit (ALU), a floating point unit (FPU), a digital signal processing core (DSP Core), or any combination thereof. A memory controller 1015 can also be used with the processor 1010, or in some implementations the memory controller 1015 can be an internal part of the processor 1010.

Depending on the desired configuration, the system memory 1020 can be of any type including but not limited to volatile memory (such as RAM), non-volatile memory (such as ROM, flash memory, etc.) or any combination thereof. System memory 1020 typically includes an operating system 1021, one or more applications 1022, and program data 1024. Application 1022 includes an authentication algorithm 1023. Program Data 1024 includes service data 1025.

Computing device 1000 can have additional features or functionality, and additional interfaces to facilitate communications between the basic configuration 1001 and any required devices and interfaces. For example, a bus/interface controller 1040 can be used to facilitate communications between the basic configuration 1001 and one or more data storage devices 1050 via a storage interface bus 1041. The data storage devices 1050 can be removable storage devices 1051, non-removable storage devices 1052, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data System memory 1020, removable storage 1051 and non-removable storage 1052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 1000. Any such computer storage media can be part of the computing device 1000.

Computing device 1000 can also include an interface bus 1042 for facilitating communication from various interface devices (e.g., output interfaces, peripheral interfaces, communication interfaces, etc.) to the basic configuration 1001 via the bus/interface controller 1040. Example output devices 1060 include a graphics processing unit 1061 and an audio processing unit 1062, which can be configured to communicate to various external devices such as a display or speakers via one or more A/V ports 1063. Example peripheral interfaces 1070 include a serial interface controller 1071 or a parallel interface controller 1072, which can be configured to communicate with external devices such as input devices (e.g., keyboard, mouse, pen, voice input device, touch input device, etc.) or other peripheral devices (e.g., printer, scanner, etc.) via one or more I/O ports 1073. An example communication device 1080 includes a network controller 1081, which can be arranged to facilitate communications with one or more other computing devices 1090 over a network communication via one or more communication ports 1082. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

It should be noted that the specifying circuit 112, the buffer specifier 114, the segmenter 311, the transformer 312, the periodogram computer 313, the delay assessment circuit 118, the pre-processors 110 and 111, the first and second threshold circuit 130 and 131, and/or the first and the second shift register 150, 151 may work in conjunction with computing device 600. In addition, it should be noted that the specifying circuit 112, the buffer specifier 114, the segmenter 311, the transformer 312, the periodogram computer 313, the delay assessment circuit 118, the pre-processors 110 and 111, the first and second threshold circuit 130 and 131, and/or the first and the second shift register 150, 151 may be comprised directly of the elements of computing device 1000 (i.e., elements 1010 and/or 1020).

Computing device 1000 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Exemplary embodiments are shown and described in the present disclosure. It is to be understood that the embodiments are capable of use in various other combinations and environments and are capable of changes or modifications within the scope of the inventive concept as expressed herein. Some such variations may include using programs stored on non-transitory computer-readable media to enable computers and/or computer systems to carry our part or all of the method variations discussed above. Such variations are not to be regarded as departure from the spirit and scope of the invention, and all such modifications as would be obvious to one skilled in the art are intended to be included within the scope of the following claims.

We claim:

1. An apparatus comprising:
 a first circuit and/or a first communication circuit;
 a second circuit and/or a second communication circuit; and
 a third circuit and/or a third communication circuit, wherein
 the second circuit and/or the second communication circuit is configured and/or programmed to offer a plurality of redemption payment options,
 the third circuit and/or the third communication circuit is configured and/or programmed to provide access to a web portal or a mobile app where funds are able to be redeemed and where two or more of the plurality of redemption payment options are to be selected,
 the second circuit and/or the second communication circuit is configured and/or programmed to determine, by an authorization engine, which applicable customer verification, velocity, and spending rules to apply based on the selected two or more redemption payment options, the second circuit and/or the second communication circuit is configured and/or programmed to request information from a user to complete a decisioning process including the determining of which applicable customer verification, velocity, and spending rules to apply, the second circuit and/or the second communication circuit is configured and/or programmed to bifurcate a payment into two or more payment portions among the selected two or more redemption payment options, wherein the selected two or more redemption payment options are selected from a group comprising: a bank account, a pre-paid credit card, a peer-to-peer network, a bill to pay, and an international money transfer, the first circuit and/or the first communication circuit is configured and/or programmed to attach a pay-advice to a payment allocation request and to transmit the payment allocation request to the second circuit and/or the second communication circuit, the third circuit and/or the third communication circuit is configured and/or programmed to receive, from the second circuit and/or the second communication circuit, an out-of-band notification that a pay-advice is available for review by the third circuit and/or the third communication circuit, the third circuit and/or the third communication circuit is configured and/or programmed to, after receipt of the out-of-band notification that the pay-advice is available for review, review and accept the pay-advice via a first communication to the second circuit and/or the second communication circuit, the second circuit and/or the second communication circuit is configured and/or programmed to notify the first circuit and/or the first communication circuit that the pay-advice was reviewed and accepted by the third circuit and/or the third communication circuit via a second communication, the second circuit and/or the second communication circuit is configured and/or programmed to notify the third circuit and/or the third communication circuit that payment allocation is available to the third circuit and/or the third communication circuit via a third communication, and the third circuit and/or the third communication circuit is configured and/or programmed to review or download p ay-advice information available at any time via a fourth communication.

2. A method comprising:

offering a plurality of redemption payment options;

providing access to a web portal or a mobile app where funds are to be redeemed and where two or more of the plurality of redemption payment options are to be selected;

determining, by an authorization engine, which applicable customer verification, velocity, and spending rules to apply based on the selected two or more redemption payment options;

requesting information from a user to complete a decisioning process including the determining of which applicable customer verification, velocity, and spending rules to apply;

bifurcating a payment into two or more payment portions among the selected two or more redemption payment options, wherein the selected two or more redemption payment options are selected from a group comprising: a bank account, a pre-paid credit card, a peer-to-peer network, a bill to pay, and an international money transfer;

attaching a pay-advice to a payment allocation request and transmitting the payment allocation request;

receiving an out-of-band notification that a pay-advice is available for review;

after receipt of the out-of-band notification that the pay-advice is available for review, reviewing and accepting the pay-advice via a first communication to a party; and notifying that the pay-advice was reviewed and accepted via a second communication, wherein payment allocation is available via a third communication, and pay-advice information is available at any time for review or download via a fourth communication.

3. A non-transitory computer readable medium having instructions stored thereon, such that when the instructions are read and executed by one or more processors, said one or more processors is configured to perform the method according to claim 2.

4. The apparatus according to claim 1, wherein the payment allocation request is issued in a pending state based on the first circuit and/or the first communication circuit attaching the pay-advice to the payment allocation request and transmitting the payment allocation request to the second circuit and/or the second communication circuit.

5. The method according to claim 2, wherein the payment allocation request is issued in a pending state based on said attaching the pay-advice to the payment allocation request and transmitting the payment allocation request.

* * * * *